(12) United States Patent
Odaira (10) Patent No.: US 11,428,284 B2
(45) Date of Patent: Aug. 30, 2022

(54) ELECTRIC MOTOR-DRIVEN BRAKE APPARATUS

(71) Applicant: HITACHI AUTOMOTIVE SYSTEMS, LTD., Hitachinaka (JP)

(72) Inventor: Atsushi Odaira, Yokohama (JP)

(73) Assignee: HITACHI ASTEMO, LTD., Ibaraki (JP)

(*) Notice: Subject to any disclaimer, the term of this patent is extended or adjusted under 35 U.S.C. 154(b) by 122 days.

(21) Appl. No.: 16/647,958

(22) PCT Filed: Sep. 18, 2018

(86) PCT No.: PCT/JP2018/034326
§ 371 (c)(1),
(2) Date: Mar. 17, 2020

(87) PCT Pub. No.: WO2019/073750
PCT Pub. Date: Apr. 18, 2019

(65) Prior Publication Data
US 2020/0217379 A1 Jul. 9, 2020

(30) Foreign Application Priority Data
Oct. 13, 2017 (JP) .............................. JP2017-199492

(51) Int. Cl.
*F16D 55/02* (2006.01)
*F16D 65/18* (2006.01)
(Continued)

(52) U.S. Cl.
CPC ......... *F16D 65/183* (2013.01); *F16D 55/226* (2013.01); *F16D 66/00* (2013.01);
(Continued)

(58) Field of Classification Search
CPC .. F16D 2125/40; F16D 65/183; F16D 55/226; F16D 2066/005; F16D 2121/24; F16D 2125/46; B60T 13/741
See application file for complete search history.

(56) References Cited

U.S. PATENT DOCUMENTS

| | | | |
|---|---|---|---|
| 6,814,190 B1 * | 11/2004 | Olschewski | ............ F16H 25/22 188/72.8 |
| 2004/0154877 A1 * | 8/2004 | Severinsson | ............ B60T 17/22 188/1.11 E |

(Continued)

FOREIGN PATENT DOCUMENTS

| | | |
|---|---|---|
| CN | 103661345 | 3/2014 |
| JP | 2006-105170 | 4/2006 |
| JP | 2008-115880 | 5/2008 |

OTHER PUBLICATIONS

International Search Report dated Nov. 27, 2018 in International (PCT) Patent Application No. PCT/JP2018/034326, with English Translation.

(Continued)

*Primary Examiner* — Nicholas J Lane
(74) *Attorney, Agent, or Firm* — Wenderoth, Lind & Ponack, L.L.P.

(57) ABSTRACT

An electric motor-driven brake apparatus has speed reduction mechanisms transmitting rotational force of an electric motor, a ball screw mechanism converting rotational force of the speed reduction mechanisms into a thrust, a piston propelled by the ball screw mechanism, and a caliper movably supporting the piston. The ball screw mechanism has a base nut non-rotatably supported relative to the caliper. The ball screw mechanism further has a push rod receiving rotational force from the speed reduction mechanisms. The push rod is movable relative to the base nut in the axial direction of the push rod. Consequently, it is possible to (Continued)

reduce the axial length of the cylinder portion of the caliper body, and hence possible to attain a size reduction. Accordingly, it is possible to improve the mountability of the electric motor-driven brake apparatus 1 onto vehicles.

16 Claims, 6 Drawing Sheets

(51) Int. Cl.
*F16D 55/226* (2006.01)
*F16D 66/00* (2006.01)
*B60T 1/06* (2006.01)
*F16D 65/52* (2006.01)
*F16D 121/24* (2012.01)
*F16D 125/40* (2012.01)
*F16D 125/46* (2012.01)
*F16D 127/02* (2012.01)

(52) U.S. Cl.
CPC ............... *B60T 1/065* (2013.01); *F16D 65/52* (2013.01); *F16D 2066/005* (2013.01); *F16D 2121/24* (2013.01); *F16D 2125/40* (2013.01); *F16D 2125/46* (2013.01); *F16D 2127/02* (2013.01)

(56) References Cited

U.S. PATENT DOCUMENTS

| | | | |
|---|---|---|---|
| 2005/0000757 A1* | 1/2005 | Wang | F16D 55/225 |
| | | | 188/71.1 |
| 2005/0092558 A1* | 5/2005 | Kapaan | F16D 65/18 |
| | | | 188/156 |
| 2009/0229933 A1* | 9/2009 | Wang | F16D 65/18 |
| | | | 188/250 H |
| 2015/0298665 A1* | 10/2015 | Horii | B60T 8/172 |
| | | | 701/70 |

OTHER PUBLICATIONS

Written Opinion of the International Searching Authority dated Nov. 27, 2018 in International (PCT) Patent Application No. PCT/JP2018/034326, with English Translation.

English Translation of Notification of Reason for Refusal dated Sep. 29, 2020 in corresponding Korean Patent Application No. 10-2019-7028321.

Office Action dated Jun. 10, 2021 in corresponding Chinese Application No. 201880023438.8 with English translation.

\* cited by examiner

ELECTRIC MOTOR-DRIVEN BRAKE APPARATUS

TECHNICAL FIELD

The present invention relates to electric motor-driven brake apparatus used to brake vehicles.

BACKGROUND ART

Patent Literature 1 discloses an electric motor-driven brake apparatus including the following: a piston capable of abutting against a rear side of a brake pad inside a vehicle; a motor; a ball ramp mechanism transmitting rotation of the motor to the piston after converting the rotation into a rectilinear motion; a speed reduction mechanism transmitting the rotation of the motor to the ball ramp mechanism after reducing the speed of the rotation; a thrust detecting sensor detecting a reaction force to the thrust applied from the piston to the brake pad; a pad wear following mechanism advancing the piston according to the wear of the brake pad; and a brake releasing mechanism releasing brake by automatically returning the piston to an initial position when the motor fails during braking.

CITATION LIST

Patent Literature

PTL 1: Japanese Patent Application Laid-Open Publication No. 2006-105170

SUMMARY OF INVENTION

Technical Problem

In the above-described electric motor-driven brake apparatus according to Patent Literature 1, the ball ramp mechanism operating during normal braking and the pad wear following mechanism operating when the pad has worn and further the thrust detecting sensor detecting a reaction force to the thrust applied to the brake pad are disposed along the axial direction; therefore, the electric motor-driven brake apparatus is likely to increase in size in the axial direction, which is unfavorable in terms of mountability onto vehicles. Accordingly, the electric motor-driven brake apparatus needs to be improved in mountability.

Solution to Problem

An object of the present invention is to provide an electric motor-driven brake apparatus configured to suppress an increase in size and to improve mountability onto vehicles.

An electric motor-driven brake apparatus according to one embodiment of the present invention has the following: a transmission mechanism transmitting rotational force of an electric motor; a screw mechanism converting the rotational force of the transmission mechanism into a thrust; a pressing member propelled by the screw mechanism; and a caliper movably supporting the pressing member. The screw mechanism includes a nut member non-rotatably supported relative to the caliper, and a shaft member receiving rotational force from the transmission mechanism. The shaft member is movable relative to the nut member in an axial direction of the shaft member.

The electric motor-driven brake apparatus according to one embodiment of the present invention is capable of suppressing an increase in size and of improving mountability onto vehicles.

DESCRIPTION OF EMBODIMENTS

The embodiment will be explained below in detail on the basis of FIGS. 1 to 6.

Figure 1:
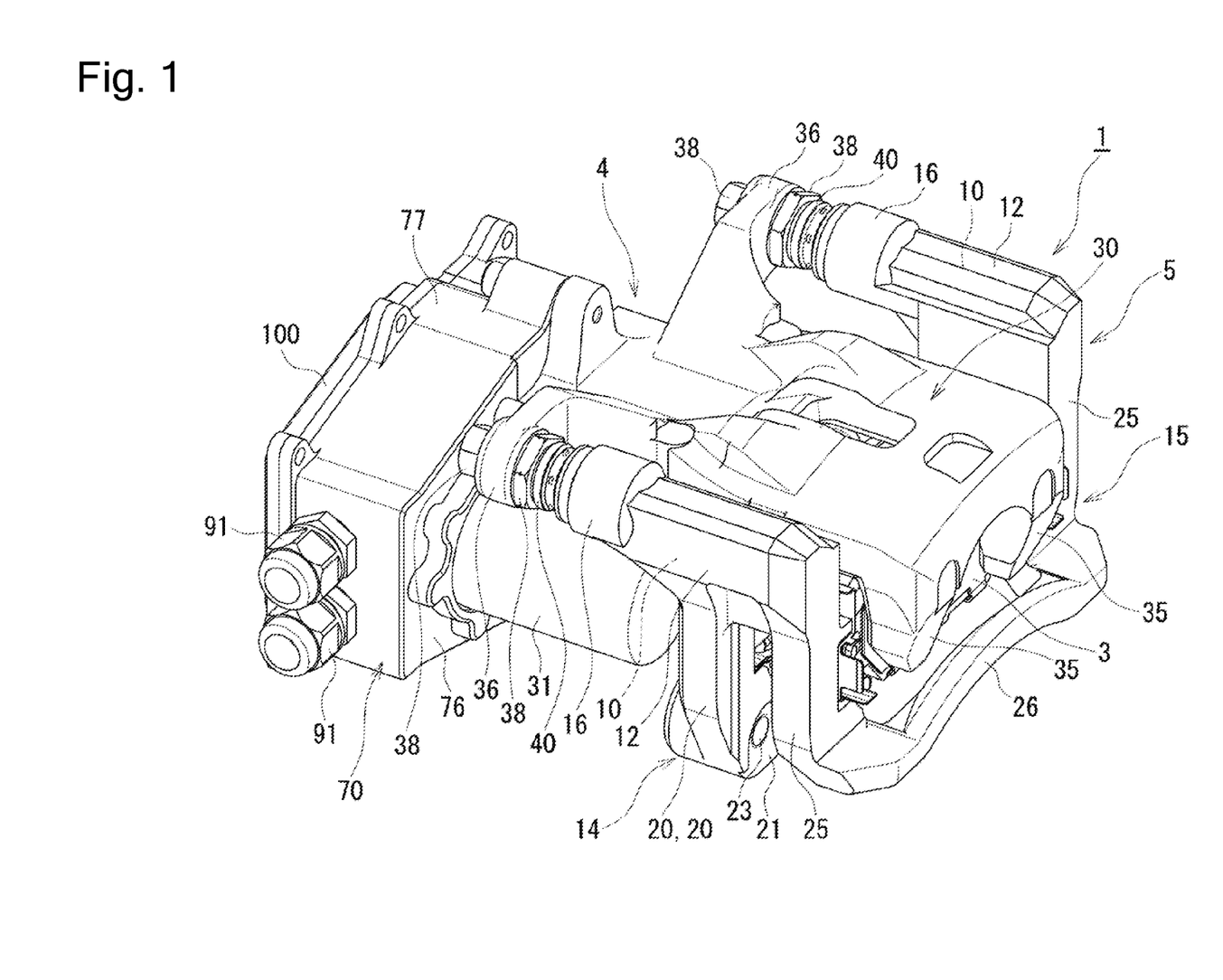
FIG. 1 is a perspective view of an electric motor-driven brake apparatus according to the embodiment.
Figure 2:
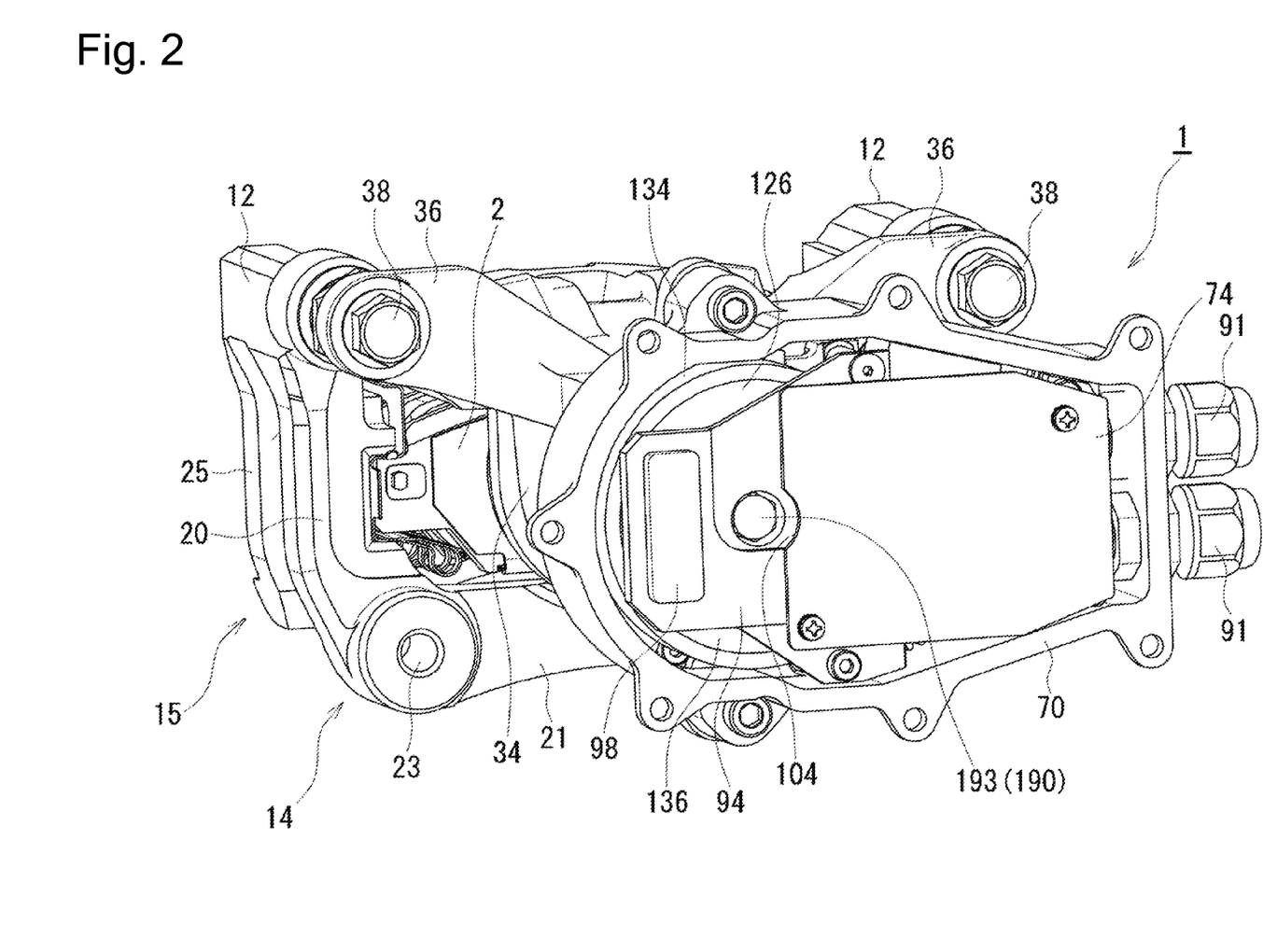
FIG. 2 is a perspective view of the electric motor-driven brake apparatus, with a cover member removed therefrom.
Figure 3:
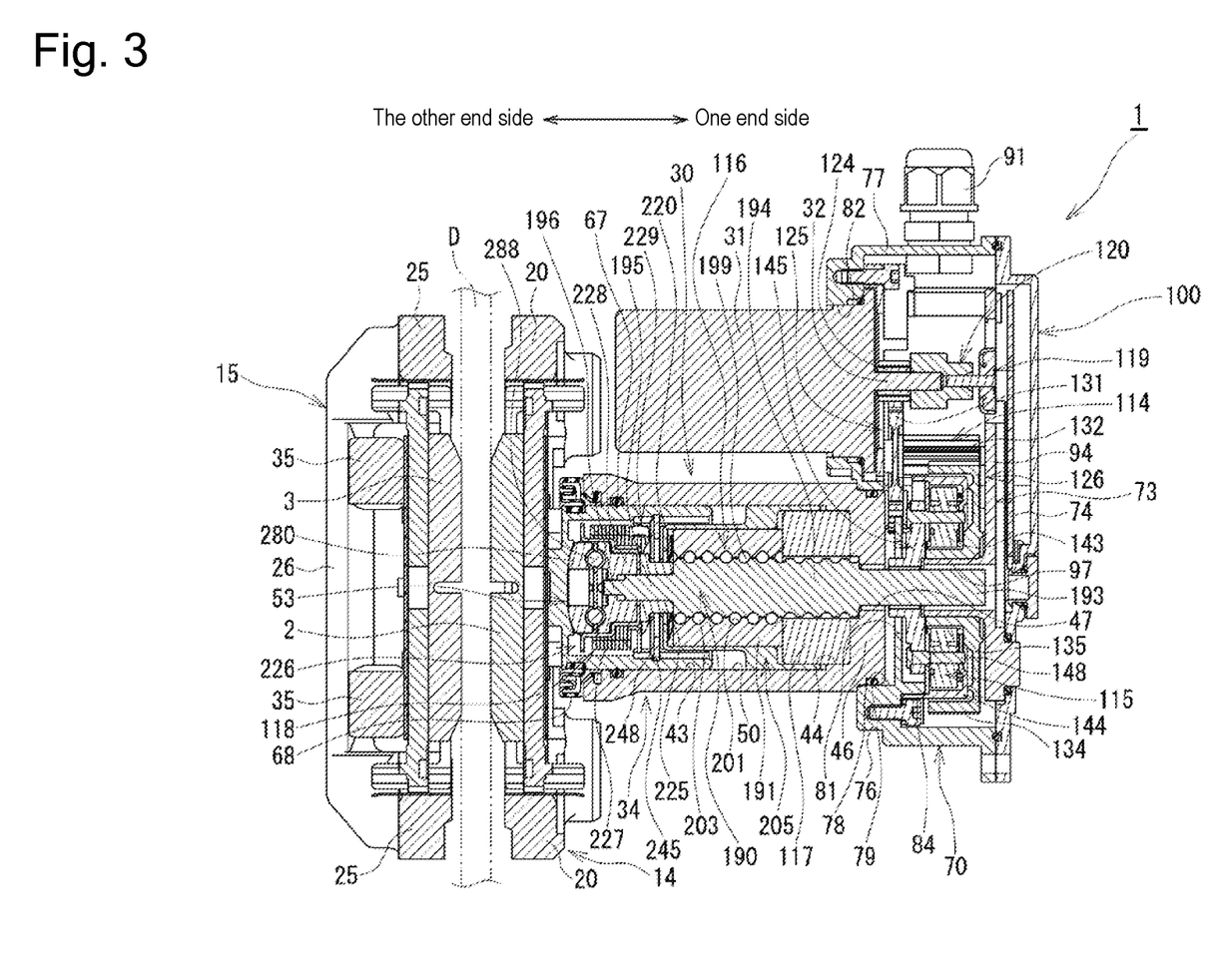
FIG. 3 is a sectional view of the electric motor-driven brake apparatus.

As shown in FIGS. 1 to 3, an electric motor-driven brake apparatus 1 according to the embodiment is provided with a pair of brake pads, i.e. an inner brake pad 2 and an outer brake pad 3, which are disposed at axially opposite sides, respectively, across a disk rotor D attached to a rotating part of a vehicle, and is further provided with a caliper 4. The electric motor-driven brake apparatus 1 is constructed as a floating-caliper brake apparatus. It should be noted that the pair of inner and outer brake pads 2 and 3 and the caliper 4 are supported by a bracket 5 secured to a non-rotating part, e.g. a knuckle, of the vehicle, in such a manner that the brake pads 2 and 3 and the caliper 4 are movable in the axial direction of the disk rotor D.

As shown in FIGS. 1 and 2, the bracket 5 includes a pair of pin-fitting portions 12 having slide pins 10 fitted therein, respectively, and inner and outer support portions 14 and 15 integrally connected to the pair of pin-fitting portions 12 and supporting the inner and outer brake pads 2 and 3 independently of each other, respectively. The pair of pin-fitting portions 12 are spaced apart from each other in the rotational direction of the disk rotor D and extend along the axial direction of the disk rotor D. Each pin-fitting portion 12 is formed in the shape of a bottomed circular cylinder. Each pin-fitting portion 12 has a slide pin 10 inserted therein. Each pin-fitting portion 12 has its opening side directed toward the inner side and its bottom side directed toward the outer side. Each pin-fitting portion 12 has a circular cylindrical pin bore boss portion 16 formed at an inner end thereof. The pin-fitting portions 12 have the outer support portion 15 integrally connected to the outer side thereof. The pin-fitting portions 12 have the inner support portion 14 connected thereto such that the inner support portion 14 is spaced from the outer support portion 15 in the direction of the axial direction of the disk rotor D.

The inner support portion 14 comprises a pair of inner arm portions 20 extending from the pin-fitting portions 12, respectively, substantially perpendicularly thereto, and an inner beam portion 21 connecting together the ends of the pair of inner arm portions 20. The inner brake pad 2 is supported inside the pair of inner arm portions 20 movably along the axial direction of the disk rotor D. The inner beam portion 21 has through-bores 23 formed in its opposite ends in the rotational direction of the disk rotor D, the through-bores 23 extending through the inner beam portion 21 along the axial direction of the disk rotor D. The bracket 5 is attached to a non-rotating part of the vehicle through the through-bores 23 provided in the inner support portion 14 (inner beam portion 21). The outer support portion 15 comprises a pair of outer arm portions 25 extending from the pin-fitting portions 12, respectively, substantially perpendicularly thereto, and an outer beam portion 26 connecting together the ends of the pair of outer arm portions 25. The outer brake pad 3 is supported inside the outer arm portions 25 movably along the axial direction of the disk rotor D.

As shown in FIGS. 1 to 3, the caliper 4 includes a caliper body 30, which is a main constituent of the caliper 4, and an electric motor 31 disposed side by side with the caliper body 30. The caliper body 30 has a circular cylindrical cylinder portion 34 disposed at a proximal end side thereof facing the inner brake pad 2 at the inner side of the vehicle such that the cylinder portion 34 is open to face the inner brake pad 2. The caliper body 30 further has claw portions 35 extending from the cylinder portion 34 toward the outer side over the disk rotor D and disposed at a distal end side of the caliper body 30 facing the outer brake pad 3 at the outer side of the vehicle. Further, the caliper body 30 has a pair of caliper arm portions 36 extending outward from the cylinder portion 34. The cylinder portion 34, the claw portions 35, and the caliper arm portions 36 are formed as an integrated structure. The pair of caliper arm portions 36 have slide pins 10 secured thereto by securing nuts 38, respectively. Pin boots 40 made of rubber are provided between the caliper arm portions 36 of the caliper body 30 and the pin-fitting portions 12 of the bracket 5. The pin boots 40 have stretchable bellows portions covering the slide pins 10, respectively.

It should be noted that the following explanation will be made properly on assumption that a side closer to a cover member 100 is one end side, and the disk rotor D side is the other end side, for the sake of explanation.

Figure 4:
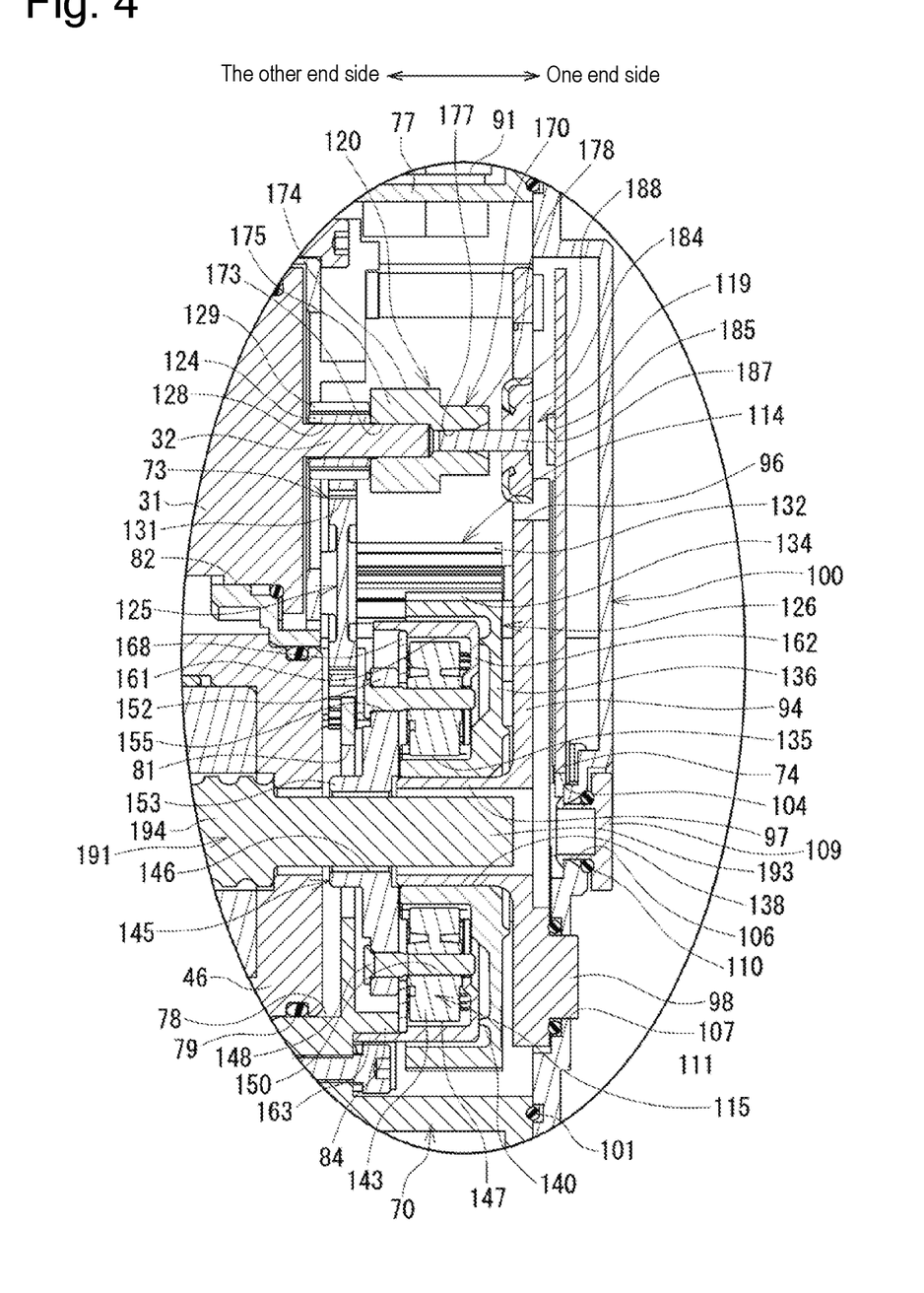
FIG. 4 is an enlarged sectional view of a motor gear assembly and its periphery in the electric motor-driven brake apparatus.
Figure 5:
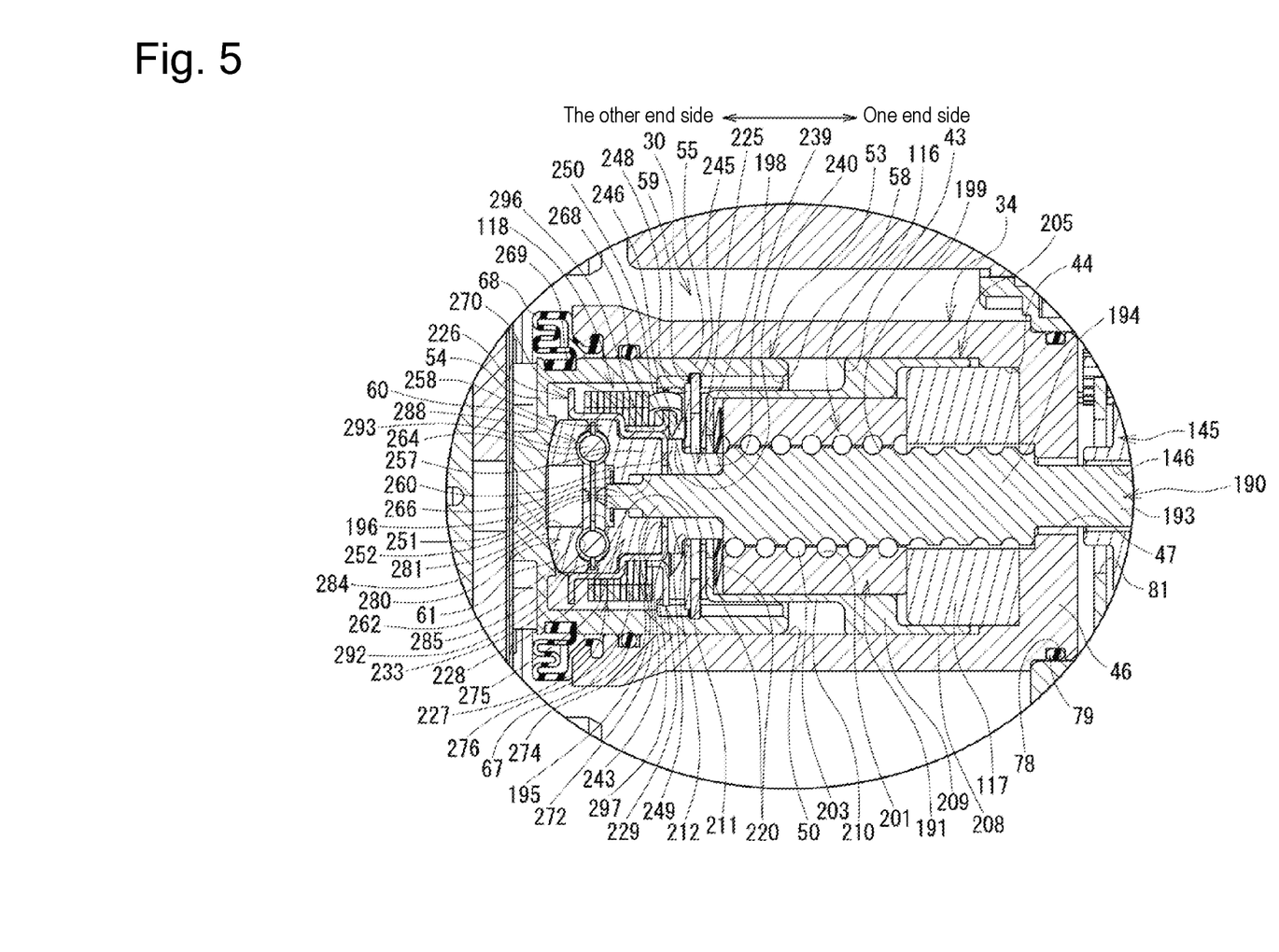
FIG. 5 is an enlarged sectional view of the interior of a cylinder in the electric motor-driven brake apparatus.

As shown in FIGS. 3 to 5, the cylinder portion 34 is formed with a bottomed cylinder bore 50 having a large-diameter opening portion 43 opened at an end thereof closer to the inner brake pad 2. The cylinder bore 50 is closed at an end thereof opposite to the end closer to the inner brake pad 2 by a bottom wall 46 having an insertion bore 47. The cylinder bore 50 has a small-diameter opening portion 44 formed at a side closer to the bottom wall 46. The small-diameter opening portion 44 is provided contiguously with the large-diameter opening portion 43 and smaller in diameter than the large-diameter opening portion 43.

A piston 53 is configured to press the inner brake pad 2 and formed in the shape of a bottomed cup comprising a bottom portion 54 and a circular cylindrical portion 55. The piston 53 corresponds to the pressing member. The circular cylindrical portion 55 has a plurality of circumferentially spaced rotation restraining recesses 58 formed in an inner peripheral surface thereof closer to one end thereof. The circular cylindrical portion 55 has an annularly extending annular groove 59 formed in the inner peripheral surface thereof closer to the other end thereof within an axial range where the rotation restraining recesses 58 are formed. The annular groove 59 has a ring-shaped plate 245 set therein. The bottom portion 54 of the piston 53 has a receiving portion 60 formed on the inner surface thereof to project toward the one end side. One end surface of the receiving portion 60 is formed into a concave spherical surface 61 abutted by a convex spherical surface 284 provided on the other end surface of a push member 280 (described later).

The piston 53 is accommodated in the cylinder bore 50 such that the bottom portion 54 faces the inner brake pad 2. The piston 53 has a recess 64 provided in the outer peripheral side of the other end surface of the bottom portion 54 facing the inner brake pad 2. The recess 64 is engaged with a projection (not shown) formed on the back side of the inner brake pad 2. The engagement prevents the piston 53 from rotating relative to the cylinder bore 50, and hence relative to the caliper body 30. The cylinder bore 50 has a seal member 67 disposed on the inner peripheral surface at the other end side of the large-diameter opening portion 43 thereof. The piston 53 is axially movably fitted in the large-diameter opening portion 43 of the cylinder bore 50 in the state of being in contact with the seal member 67. A dust boot 68 is interposed between an outer peripheral surface of the piston 53 at a side thereof closer to the bottom portion 54 and the other end-side inner peripheral surface of the large-diameter opening portion 43 of the cylinder bore 50. The seal member 67 and the dust boot 68 prevent the entry of foreign substances into the cylinder bore 50.

A gear housing 70 is disposed at the bottom wall 46 side of the cylinder portion 34 of the caliper body 30. The gear housing 70 accommodates therein a motor gear assembly 73 and a control board 74. The gear housing 70 comprises a bottom wall portion 76 located at the other end side, i.e. at the side closer to the cylinder bore 50, and a sidewall portion 77 integrally extending toward the one end side from the outer peripheral portion of the bottom wall portion 76. The bottom wall portion 76 of the gear housing 70 has a support recess 78 supporting the bottom wall 46 of the cylinder portion 34 (cylinder bore 50). The bottom wall 46 of the cylinder portion 34 (cylinder bore 50) is air-tightly supported by the support recess 78 through a seal member 79. The support recess 78 has a bottom wall portion formed with a first opening portion 81 through which is inserted a small-diameter circular cylindrical portion 153 of a carrier 145 including a push rod 190 (described later). The bottom wall portion 76 of the gear housing 70 is formed with a second opening portion 82 into which the body part of the electric motor 31 is inserted and secured.

The bottom wall portion 76 of the gear housing 70 is provided with a circular cylindrical restricting portion 84 projecting toward the one end side from substantially the same position as the support recess 78. The circular cylindrical restricting portion 84 has discontinuous regions along the circumferential direction thereof. The gear housing 70 has connectors 91 supported by the sidewall portion 77 near the electric motor 31, the connectors 91 being electrically connected to the control board 74. The gear housing 70 has a support plate 94 disposed therein to divide the interior of the gear housing 70 into a space accommodating the motor gear assembly 73 and a space accommodating the control board 74. The support plate 94 also supports the control board 74. The support plate 94 is secured to the gear housing 70.

The motor gear assembly 73 is disposed in the gear housing 70 at a position closer to the other end side than the support plate 94. The control board 74 is secured to the one end-side surface of the support plate 94. The support plate 94 has an opening portion 96 formed in a region facing a rotating shaft 32 of the electric motor 31. The opening portion 96 receives a ring-shaped magnet member 184 of a rotation angle detecting part 119 (described later). The support plate 94 is provided with a circular cylindrical support portion 97 projecting toward the other end side, i.e.

toward the motor gear assembly 73 so as to accommodate one end of the later-described push rod 190. The support plate 94 is provided with a substantially rectangular parallelepiped projecting portion 98 projecting toward the one end side from an outer peripheral portion close to the circular cylindrical support portion 97. The gear housing 70 has a cover member 100 air-tightly attached through a seal member 101 to a one end-side opening thereof in such a manner as to cover the control board 74.

The control board 74 has a cut portion 104 (see also FIG. 2) formed in an end portion thereof close to the circular cylindrical support portion 97 of the support plate 94 to prevent interference with the push rod 190. The cut portion 104 is recessed in an arcuate shape. The cut portion 104 makes it possible to extend the range of movement of the later-described push rod 190 toward the one end side from a region where the control board 74 is disposed, i.e. from the support plate 94, to the one end-side space. It should be noted that although in this embodiment the cut portion 104 for preventing interference with the push rod 190 is formed in the end portion of the control board 74, a hole or the like may be formed in place of the cut portion 104. The cover member 100 has a first through-bore 106 at a position facing one end of the push rod 190. The first through-bore 106 is air-tightly closed by a cap 109 through a seal member 110. The cover member 100 has a substantially rectangular second through-bore 107 formed at a position close to the first through-bore 106. The second through-bore 107 has the projecting portion 98 of the support plate 94 air-tightly inserted therein through a seal member 111.

The caliper body 30 includes an electric motor 31, a combination of a spur gear multistage speed reduction mechanism 114 and a planetary gear speed reduction mechanism 115, a ball screw mechanism 116, a thrust sensor 117, a return mechanism 118, a rotation angle detecting part 119, and a thrust holding part 120. The spur gear multistage speed reduction mechanism 114 and the planetary gear speed reduction mechanism 115 serve as a motor gear assembly 73 which is a transmission mechanism increasing the rotational torque from the electric motor 31. The ball screw mechanism 116 receives rotation transmitted from the spur gear multistage speed reduction mechanism 114 and the planetary gear speed reduction mechanism 115 and applies a thrust to the piston 53. The thrust sensor 117 is a thrust detecting part detecting a reaction force to the thrust (pressing force) applied to the inner and outer brake pads 2 and 3 from the piston 53. The return mechanism 118 stores, when the push rod 190 propels the piston 53, rotational force for rotating the push rod 190 of the ball screw mechanism 116 to be moved in the retracting direction. The rotation angle detecting part 119 detects a rotation angle of the rotating shaft 32 of the electric motor 31. The thrust holding part 120 holds the thrust applied to the inner and outer brake pads 2 and 3 from the piston 53 during braking.

The electric motor 31 is disposed substantially parallel to the cylinder portion 34. The electric motor 31 is secured with its body part inserted into the second opening portion 82 of the gear housing 70. The rotating shaft 32 of the electric motor 31 extends into the gear housing 70. Referring mainly to FIG. 4, the spur gear multistage speed reduction mechanism 114 has a pinion gear 124, a first speed reduction gear 125, and a second speed reduction gear 126. The first speed reduction gear 125 and the second speed reduction gear 126 are made of metal or a resin, e.g. a fiber-reinforced resin. The pinion gear 124 has a bore 128 formed in the shape of a cylinder and press-fittingly secured to the rotating shaft 32 of the electric motor 31. The pinion gear 124 further has a gear 129 formed on the outer periphery thereof. The first speed reduction gear 125 includes a large-diameter wheel 131 meshed with the gear 129 of the pinion gear 124, and a small-diameter pinion 132 concentrically and axially extending from the wheel 131 toward the one end side. The first speed reduction gear 125 is rotatably supported relative to the gear housing 70.

The pinion 132 of the first speed reduction gear 125 is in mesh with the second speed reduction gear 126. The second speed reduction gear 126 includes a large-diameter wheel 134 meshed with the pinion 132 of the first speed reduction gear 125, and a sun gear 135 concentrically and axially extending from the wheel 134 toward the other end side. The sun gear 135 is constructed as a part of the later-described planetary gear speed reduction mechanism 115. The wheel 134 and sun gear 135 of the second speed reduction gear 126 are integrally connected together by an annular ring-shaped wall portion 136 at the one end side thereof. The second speed reduction gear 126 has a bore 138 in the radial center thereof. The bore 138 receives a circular cylindrical support portion 97 projecting toward the other end side from the support plate 94 disposed in the gear housing 70. Thus, the second speed reduction gear 126 is rotatably supported relative to the gear housing 70. The ring-shaped wall portion 136 of the second speed reduction gear 126 is formed with an annular stopper portion 140 projecting toward the planetary gear speed reduction mechanism 115.

The planetary gear speed reduction mechanism 115 has the sun gear 135 of the second speed reduction gear 126, a plurality (four in this embodiment) of planetary gears 143, an internal gear 144, and a carrier 145. Each planetary gear 143 has a gear 147 meshed with the sun gear 135 of the second speed reduction gear 126, and a bore 150 in which is rotatably inserted a pin 148 stood from the carrier 145. The planetary gears 143 are disposed at the one end side of the carrier 145 at equal spaces along the circumferential direction.

The carrier 145 has a polygonal bore 146 formed to extend axially through substantially the radial center thereof. The polygonal bore 146 has an inner peripheral surface formed into a hexagonal shape, for example. The carrier 145 comprises a large-diameter ring plate-shaped portion 152 and a small-diameter circular cylindrical portion 153 concentrically projecting from the large-diameter ring plate-shaped portion 152 toward the other end side. The small-diameter circular cylindrical portion 153 of the carrier 145 is inserted into the first opening portion 81 of the gear housing 70. The large-diameter ring plate-shaped portion 152 of the carrier 145 is formed with an outer diameter smaller than the outer diameter of the revolution orbit of the planetary gears 143. The large-diameter ring plate-shaped portion 152 of the carrier 145 has a plurality of circumferentially spaced pin bores 155 formed in an outer peripheral portion thereof in correspondence to the planetary gears 143.

Pins 148 are press-fittingly secured in the pin bores 155, respectively, of the carrier 145. Each pin 148 is rotatably inserted in the bore 150 of the associated planetary gear 143. Further, the polygonal bore 146 of the carrier 145 and a polygonal rod portion 193 of the push rod 190 of the later-described ball screw mechanism 116 are fitted to each other, thereby allowing the rotational torque to be transmitted between the carrier 145 and the push rod 190.

The internal gear 144 is disposed inside the wheel 134 of the second speed reduction gear 126. The internal gear 144 includes an internal gear portion 161 meshed with the gear 147 of each planetary gear 143, an annular wall portion 162 radially and continuously extending from one end of the internal gear portion 161 to restrain the axial movement of the planetary gear 143, and a circular cylindrical wall portion 163 extending from the internal gear portion 161 toward the other end side. The circular cylindrical wall portion 163 has an inner peripheral surface abutting against the outer peripheral surface of the circular cylindrical restricting portion 84 provided on the gear housing 70 to restrain the radial movement of the internal gear 144. The internal gear 144 is supported non-rotatably relative to the gear housing 70. Regarding the internal gear 144, the other end of the circular cylindrical wall portion 163 abuts against the inner surface of the gear housing 70, and one end surface of the annular wall portion 162 is abutted by the annular stopper portion 140 provided on the ring-shaped wall portion 136 of the second speed reduction gear 126. Thus, the internal gear 144 is supported by the gear housing 70 so that the axial movement thereof is retrained.

A ring-shaped plate 168 is disposed between the other end surfaces of the planetary gears 143 and one end surface of the carrier 145 (large-diameter ring plate-shaped portion 152). The ring-shaped plate 168 is held between an end surface of the internal gear portion 161 and one end surface of the circular cylindrical restricting portion 84 of the gear housing 70. Thus, the axial movement of the planetary gears 143 is restrained. The ring-shaped plate 168 has a plurality of pins 148 inserted therethrough. It should be noted that, although this embodiment employs the spur gear multistage speed reduction mechanism 114 and the planetary gear speed reduction mechanism 115 as a speed reduction mechanism increasing the driving force from the electric motor 31, only the planetary gear speed reduction mechanism 115 may be used to constitute the speed reduction mechanism. It is also possible to combine the planetary gear speed reduction mechanism 115 with a speed reducer according to other publicly known techniques such as a cycloid speed reduction mechanism, a wave speed reducer, etc.

Figure 6:
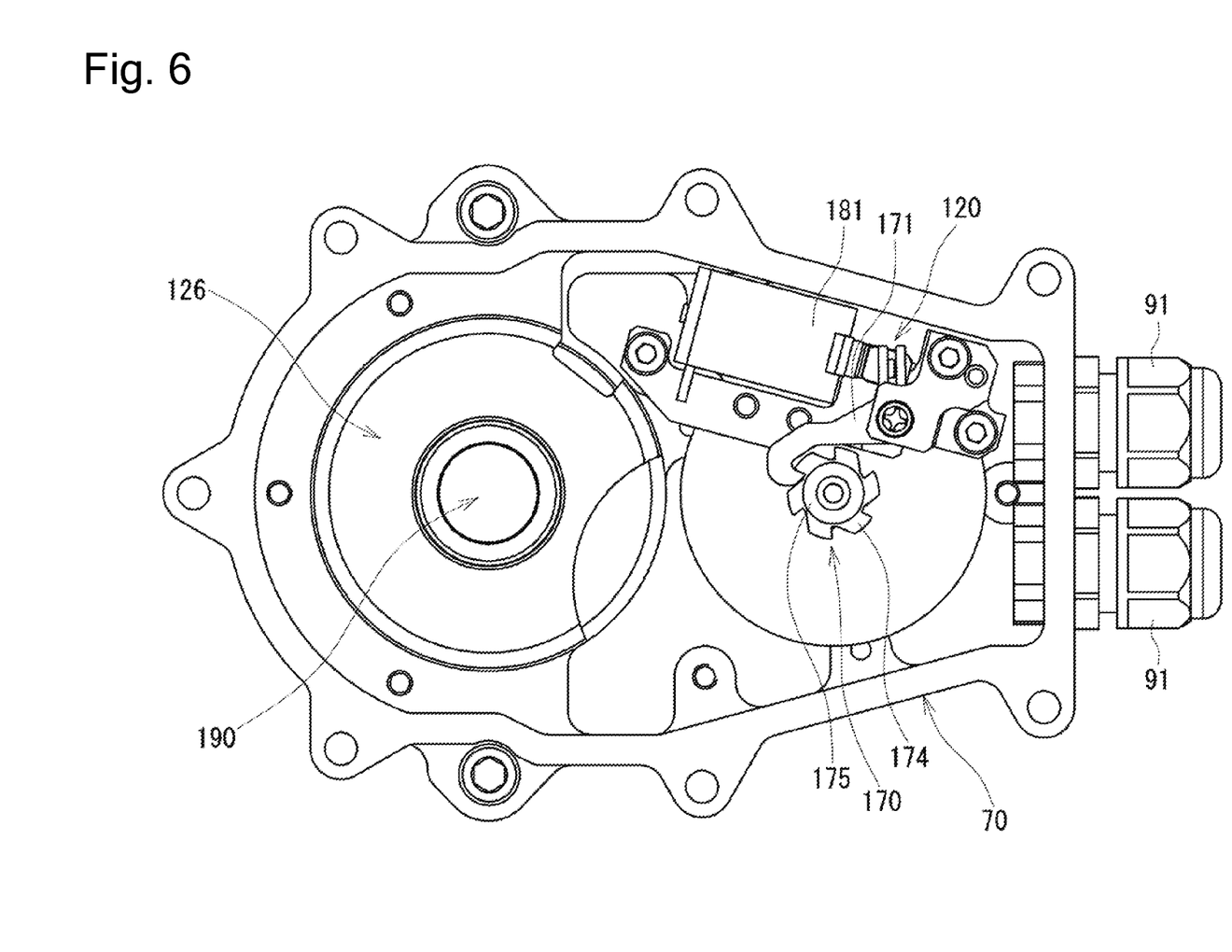
FIG. 6 is a plan view of the electric motor-driven brake apparatus, with the cover member and support plate removed therefrom.

The thrust holding part 120 is disposed at the one end side of the pinion gear 124. The rotating shaft 32 of the electric motor 31 projects from the pinion gear 124 toward the one end side. The thrust holding part 120 includes a ratchet gear 170 press-fittingly secured to one end of the rotating shaft 32 of the electric motor 31, and a lever member 171 (see FIG. 6) engaged with a gear portion 174 of the ratchet gear 170. The ratchet gear 170 is formed in the shape of a circular cylinder. The ratchet gear 170 comprises a gear body portion 175 having a first bore 173 and also having a gear portion 174 formed on an outer peripheral surface thereof, and a circular cylindrical support portion 178 integrally projecting from the gear body portion 175 toward the one end side and having a second bore 177. One end of the rotating shaft 32 of the electric motor 31 is press-fittingly secured in the first bore 173 of the gear body portion 175. Referring also to FIG. 6, the lever member 171 is reciprocated by a solenoid actuator 181 so as to engage with or disengage from the gear portion 174 of the ratchet gear 170 (gear body portion 175). The solenoid actuator 181 is electrically connected to the control board 74.

Referring mainly to FIGS. 3 and 4, the rotation angle detecting part 119 is disposed at the one end side of the ratchet gear 170. The rotation angle detecting part 119 detects a rotation angle of the rotating shaft 32 of the electric motor 31 and includes a magnet member 184 and a magnetism-detecting IC chip 185. The ratchet gear 170 has a support rod 187 press-fittingly secured in the second bore 177 of the circular cylindrical support portion 178. The support rod 187 projecting from one end surface of the circular cylindrical support portion 178 toward the one end side supports a ring-shaped magnet member 184 disposed in a cup-shaped support member 188. The magnet member 184 including the support member 188 is disposed in the opening portion 96 of the support plate 94. The magnetism-detecting IC chip 185 is disposed so as to face the one end side of the magnet member 184. The magnetism-detecting IC chip 185 detects a change of a magnetic field generated from the magnet member 184. The magnetism-detecting IC chip 185 is secured to the other end surface of the control board 74. The change of magnetic flux from the rotating magnet member 184 is detected by the magnetism-detecting IC chip 185, thereby enabling the rotation angle of the rotating shaft 32 of the electric motor 31 to be detected computationally by the control board 74.

Referring mainly to FIGS. 3 and 5, the ball screw mechanism 116 converts rotational motion from the spur gear multistage speed reduction mechanism 114 and the planetary gear speed reduction mechanism 115, i.e. the rotational motion of the electric motor 31, into rectilinear motion (hereinafter referred to as "linear motion" for the sake of convenience) and applies a thrust to the piston 53. The ball screw mechanism 116 comprises a push rod 190 as a shaft member to which rotational motion is transmitted from the spur gear multistage speed reduction mechanism 114 and the planetary gear speed reduction mechanism 115, and a base nut 191 as a nut member which is threadedly engaged with the outer peripheral surface of the push rod 190.

The push rod 190 includes a polygonal rod portion 193 formed in a range from the insertion bore 47 provided in the bottom wall 46 of the cylinder portion 34 to substantially the whole axial region in the circular cylindrical support portion 97 of the support plate 94. The push rod 190 further includes a large-diameter rod portion 194 integrally extending from the other end of the polygonal rod portion 193 toward the other end side, and an intermediate-diameter rod portion 195 integrally extending from the other end of the large-diameter rod portion 194 toward the other end side. Further, the push rod 190 includes a small-diameter rod portion 196 integrally extending from the other end of the intermediate-diameter rod portion 195 toward the other end side.

The polygonal rod portion 193 is formed to be smaller in diameter than the large-diameter rod portion 194. The polygonal rod portion 193 has an outer peripheral surface formed into a polygonal shape, e.g. a hexagonal shape. The polygonal rod portion 193 is fitted into the polygonal bore 146 of the carrier 145 of the planetary gear speed reduction mechanism 115. The large-diameter rod portion 194 has a helical groove 199 formed in an outer peripheral surface thereof along the radial center line. The large-diameter rod portion 194 is formed in a range from the bottom wall 46 of the cylinder portion 34 to the other end surface of the later-described base nut 191. The intermediate-diameter rod portion 195 has an axially extending key groove (not shown) formed in an outer peripheral surface thereof. The intermediate-diameter rod portion 195 is inserted to extend from an insertion bore 233 of a first clutch member 225 (described later) through a second clutch member 226 to a first insertion bore 251 of a third clutch member 228. The small-diameter rod portion 196 is inserted into a second insertion bore 252 of the later-described third clutch member 228. An annular step surface 198 is formed between the large-diameter rod portion 194 and the intermediate-diameter rod portion 195.

The base nut 191 is disposed radially outward of the large-diameter rod portion 194 of the push rod 190. The base nut 191 is formed in the shape of a circular cylinder. The base nut 191 has a helical groove 201 formed in an inner peripheral surface thereof along the radial center line. The base nut 191 has an axially extending key groove (not shown) formed in an outer peripheral surface thereof. A plurality of balls 203 are disposed between the helical groove 199 of the push rod 190 and the helical groove 201 of the base nut 191. A circular cylindrical thrust sensor 117 is disposed between one end surface of the base nut 191 and the bottom wall 46 of the cylinder bore 50 in such a manner as to abut against the one end surface of the base nut 191 and the bottom wall 46. The thrust sensor 117 comprises a circular cylindrical load cell. The thrust sensor 117 detects a reaction force to the thrust applied to the inner and outer brake pads 2 and 3 from the piston 53. The one end-side outer peripheral surface of the thrust sensor 117 abuts against the inner peripheral surface of the small-diameter opening portion 44 of the cylinder bore 50.

A stopper member 205 is disposed between the base nut 191 and the main part of the thrust sensor 117 (main part of the thrust sensor 117 other than the one end-side portion thereof), on the one hand, and, on the other, the inner wall surface of the large-diameter opening portion 43 of the cylinder bore 50. The stopper member 205 is formed in the shape of a bottomed circular cylinder as a whole. The stopper member 205 includes the following: a large-diameter thin-walled portion 208 located at the one end side; a large-diameter thick-walled portion 209 integrally extending from the other end of the large-diameter thin-walled portion 208 toward the other end side; a small-diameter thin-walled portion 210 integrally extending from the other end of the large-diameter thick-walled portion 209 toward the other end side; and a bottom wall portion 211 projecting inward from the other end of the small-diameter thin-walled portion 210 and having an insertion bore 212 in the radial center.

The large-diameter thin-walled portion 208 abuts at an outer peripheral surface thereof against the inner peripheral surface of the large-diameter opening portion 43 of the cylinder bore 50 and abuts at an inner peripheral surface thereof against the outer peripheral surface of the thrust sensor 117. The large-diameter thick-walled portion 209 has an axially extending key groove (not shown) formed in an inner peripheral surface thereof. The large-diameter thick-walled portion 209 abuts at an outer peripheral surface thereof against the inner peripheral surface of the large-diameter opening portion 43 of the cylinder bore 50 and abuts at an inner peripheral surface thereof against the outer peripheral surface of the base nut 191. The large-diameter thick-walled portion 209 has an engaging recess (not shown) formed in the outer peripheral surface of the other end thereof. The small-diameter thin-walled portion 210 abuts at an inner peripheral surface thereof against the outer peripheral surface of the base nut 191 and has its other end side disposed in the piston 53. The stopper member 205 has a first clutch small-diameter portion 239 of the later-described first clutch member 225 inserted in the insertion bore 212 provided in the bottom wall portion 211 thereof.

The stopper member 205 is supported non-rotatably relative to the cylinder portion 34 and restrained from moving toward the other end side by disposing the distal end of a rotation restraining shaft (not shown) in the engaging recess (not shown) provided in the large-diameter thick-walled portion 209, the rotation restraining shaft being inserted through the peripheral wall portion of the cylinder portion 34 from the radially outer side. An oblong first key member (not shown) is disposed between the key groove (not shown) provided in the inner peripheral surface of the large-diameter thick-walled portion 209 of the stopper member 205 and the key groove (not shown) provided in the outer peripheral surface of the base nut 191. The first key member disables relative rotation between the stopper member 205 and the base nut 191. Two superimposed first wave washers 220 are disposed between the other end surface of the base nut 191 and the bottom wall portion 211 of the stopper member 205. The first wave washers 220 urge the base nut 191 toward the one end side (toward the thrust sensor 117) relative to the stopper member 205.

The return mechanism 118, which is occasionally referred to as "fail open mechanism", releases the braking force applied to the disk rotor D from the inner and outer brake pads 2 and 3 when there is a failure in the electric motor 31, the control board 74, etc. during braking. That is, the return mechanism 118 stores, when the push rod 190 propels the piston 53, rotational force for moving the piston 53 in the retracting direction. When the reaction force to the thrust is greater than a set reaction force, the return mechanism 118 stores rotational force for rotating the push rod 190 to be moved in the retracting direction. The return mechanism 118 includes a first clutch member 225, a second clutch member 226, a return spring 227, a third clutch member 228, and a spring holder 229.

The first clutch member 225 is formed in the shape of a circular cylinder having an insertion bore 233 in which the intermediate-diameter rod portion 195 is inserted. The first clutch member 225 has an axially extending key groove (not shown) formed in the inner peripheral surface of the insertion bore 233. An oblong second key member (not shown) is disposed between the key groove (not shown) provided in the outer peripheral surface of the intermediate-diameter rod portion 195 and the key groove (not shown) provided in the inner peripheral surface of the insertion bore 233 of the first clutch member 225. The second key member disables relative rotation between the first clutch member 225 and the push rod 190. The first clutch member 225 includes a first clutch small-diameter portion 239 located at the one end side and a first clutch large-diameter portion 240 integrally formed to extend from the other end of the first clutch small-diameter portion 239 toward the other end side.

The annular step surface 198 between the large-diameter rod portion 194 and intermediate-diameter rod portion 195 of the push rod 190 is abuttable against one end surface of the first clutch small-diameter portion 239 of the first clutch member 225. The first clutch large-diameter portion 240 has a clutch friction material (facing) provided on an annular surface 243 thereof, which is the other end surface of the first clutch large-diameter portion 240. A ring-shaped plate 245 is disposed around the first clutch small-diameter portion 239 at a position closer to the other end side than the bottom wall portion 211 of the stopper member 205. The outer peripheral portion of the ring-shaped plate 245 is engaged in the annular groove 59 provided in the inner peripheral surface of the piston 53.

It should be noted that the ring-shaped plate 245 is reduced in outer diameter when incorporated into the piston 53, and when the ring-shaped plate 245 reaches the annular groove 59, the outer diameter thereof enlarges, and the outer peripheral portion of the ring-shaped plate 245 is engaged in the annular groove 59. The ring-shaped plate 245 has an insertion bore 246 through which is inserted the first clutch small-diameter portion 239 of the first clutch member 225. The insertion bore 246 is formed to be larger in diameter than the insertion bore 212 provided in the bottom wall portion 211 of the stopper member 205. A ring-shaped plate 248 is disposed at the other end side of the ring-shaped plate 245 in abutting contact therewith. The ring-shaped plate 248 has an insertion bore 249 through which is inserted the first clutch small-diameter portion 239 of the first clutch member 225. The ring-shaped plate 248 has an outer diameter smaller than that of the ring-shaped plate 245 and is disposed inside the piston 53. A second wave washer 250 is disposed at the other end side of the ring-shaped plate 248 in abutting contact therewith. The third clutch member 228 is disposed at the other end side of the first clutch member 225 with the second clutch member 226 interposed therebetween. First, the third clutch member 228 will be explained below.

The third clutch member 228 is formed in the shape of a circular cylinder having a first insertion bore 251 receiving the intermediate-diameter rod portion 195 and small-diameter rod portion 196 of the push rod 190 and further having a second insertion bore 252 disposed at the other end side of the first insertion bore 251 to receive the small-diameter rod portion 196. The first insertion bore 251 of the third clutch member 228 and the insertion bore 233 of the first clutch member 225 have the same inner diameter. The first insertion bore 251 has an axially extending key groove (not shown) formed in the inner peripheral surface thereof. An oblong second key member (not shown) is disposed between the key groove (not shown) provided in the outer peripheral surface of the intermediate-diameter rod portion 195 of the push rod 190 and the key groove (not shown) provided in the inner peripheral surface of the first insertion bore 251 of the third clutch member 228, the second key member being common to the first and third clutch members 225 and 228. The second key member disables relative rotation between the first and third clutch members 225 and 228, on the one hand, and, on the other, the push rod 190.

The third clutch member 228 includes a third clutch small-diameter portion 257 located at the one end side, and a third clutch large-diameter portion 258 integrally projecting from the other end of the third clutch small-diameter portion 257 toward the other end side. The third clutch small-diameter portion 257 has a clutch friction material (facing) provided on an annular surface 260 thereof, which is one end surface of the third clutch small-diameter portion 257. The outer diameter of the third clutch small-diameter portion 257 of the third clutch member 228 and the outer diameter of the first clutch large-diameter portion 240 of the first clutch member 225 substantially coincide with each other. The third clutch large-diameter portion 258 has a circular recess 262 formed substantially in the radial center of the other end surface thereof. The other end surface of the third clutch large-diameter portion 258 has an annular groove 264 formed around the circular recess 262, the annular groove 264 having a bottom surface formed to have an arcuate cross-section.

The small-diameter rod portion 196 of the push rod 190 has a C-shaped coming-off prevention retaining ring 266 fitted to the distal end thereof after the small-diameter rod portion 196 has been inserted through the second insertion bore 252 of the third clutch member 228. The second clutch member 226 is disposed in the range from between the first clutch large-diameter portion 240 of the first clutch member 225 and the third clutch small-diameter portion 257 of the third clutch member 228 to the radial outside of the third clutch member 228.

The second clutch member 226 includes a disk-shaped clutch portion 268, a skirt portion 269 integrally extending from the outer periphery of the disk-shaped clutch portion 268 toward the other end side, and a flange portion 270 extending radially outward from the other end of the skirt portion 269. The disk-shaped clutch portion 268, the skirt portion 269, and the flange portion 270 are formed to have the same thin wall thickness. The disk-shaped clutch portion 268 has an insertion bore 272 formed in the radial center thereof to receive the intermediate-diameter rod portion 195 of the push rod 190. The disk-shaped clutch portion 268 is disposed between the first clutch large-diameter portion 240 of the first clutch member 225 and the third clutch small-diameter portion 257 of the third clutch member 228. The disk-shaped clutch portion 268 has clutch friction materials provided on both surfaces thereof.

The skirt portion 269 includes a skirt small-diameter portion 274 extending along the outer peripheral surface of the third clutch small-diameter portion 257 of the third clutch member 228, and a skirt large-diameter portion 275 extending along the outer peripheral surface of the third clutch large-diameter portion 258 of the third clutch member 228. The skirt small-diameter portion 274 and the skirt large-diameter portion 275 are integrally connected to each other through an annular wall portion 276. The flange portion 270 of the second clutch member 226 is connected to the other end of the return spring 227. One end of the return spring 227 is bent so as to be folded back, and the bent portion of the return spring 227 is engaged in an engaging groove (not shown) provided in a flange portion 297 of the later-described spring holder 229. In this way, the return spring 227 is connected to the spring holder 229.

The return spring 227 comprises a coil spring. The return spring 227 can store rotational force for rotating the push rod 190 in the retracting direction. The return spring 227 is disposed radially outward of the skirt portion 269 of the third clutch member 228. It should be noted that a predetermined set torque has previously been applied to the return spring 227 in the rotational direction. A push member 280 is disposed to face the third clutch large-diameter portion 258 of the third clutch member 228. The push member 280 is formed in the shape of a circular cylinder. The push member 280 has an axially extending through-bore 281 having an outer diameter substantially the same as the outer diameter of the circular recess 262 provided in the third clutch large-diameter portion 258 of the third clutch member 228. The other end surface of the push member 280 is formed into a convex spherical surface 284. One end surface of the push member 280 has an annular groove 285 formed around the through-bore 281, the annular groove 285 having a bottom surface formed to have an arcuate cross-section.

A thrust bearing 288 is disposed between the annular groove 264 provided in the third clutch large-diameter portion 258 of the third clutch member 228 and the annular groove 285 provided in the push member 280. The thrust bearing 288 comprises a retainer 292 having a plurality of circumferentially spaced support holes formed in a plate-shaped part extending in the shape of a ring, and balls 293 rotatably retained in the support holes, respectively, of the retainer 292. The spring holder 229 is disposed radially outward of the disk-shaped clutch portion 268 of the second clutch member 226 and the skirt small-diameter portion 274 of the skirt portion 269 of the second clutch member 226.

The spring holder 229 comprises a skirt portion 296 formed to surround the periphery of the skirt small-diameter portion 274 of the second clutch member 226, and a flange portion 297 extending radially outward from one end of the skirt portion 296. The skirt portion 296 and the flange portion 297 are formed to have the same thin wall thickness. The other end surface of the skirt portion 296 is disposed to be abuttable against the annular wall portion 276 of the second clutch member 226. The flange portion 297 is located radially outward of the disk-shaped clutch portion 268 of the second clutch member 226. The flange portion 297 has an engaging groove (not shown) formed in the outer peripheral surface thereof, the engaging groove being engageable with the bent portion at the one end of the return spring 227. The flange portion 297 has a stopper portion (not shown) formed on the outer peripheral surface thereof, the stopper portion projecting toward the one end side from a circumferential part of the flange portion 297. The spring holder 229 is supported non-rotatably relative to the piston 53 by engaging the stopper portion in a rotation restraining recess 58 provided in the inner peripheral surface of the piston 53. A second wave washer 250 is disposed between the flange portion 297 of the spring holder 229 and the ring-shaped plate 248. The second wave washer 250 urges the ring-shaped plate 248 and the ring-shaped plate 245 toward the one end side relative to the flange portion 297 of the spring holder 229.

The drive of the electric motor 31 is controlled by a command from the control board 74. The control board 74 is secured to the one end-side surface of the support plate 94 dividing the interior of the gear housing 70 into two spaces, as has been explained above. The control board 74 is electrically connected to the magnetism-detecting IC chip 185 of the rotation angle detecting part 119. The control board 74 is electrically connected to the thrust sensor 117. Further, the control board 74 is electrically connected to various detecting sensors, such as detecting sensors detecting the driver's demands, e.g. a stroke sensor attached to a brake pedal (not shown), and detecting sensors detecting various situations requiring braking without a driver's demand. The control board 74 is electrically connected to a parking switch (not shown) actuated to instruct activation or release of the parking brake, which is one example of the operation for maintaining a halt condition of the vehicle. The control board 74 is electrically connected to a solenoid actuator 181 for activating the lever member 171 of the thrust holding part 120.

When braking during normal running, the control board 74 controls the drive of the electric motor 31 on the basis of detection signals such as detection signals from detection sensors corresponding to the driver's demands and from various detection sensors detecting various situations requiring braking, a detection signal from the magnetism-detecting IC chip 185 of the rotation angle detecting part 119, and a detection signal from the thrust sensor 117. Further, the control board 74 controls the drive of the lever member 171 of the thrust holding part 120 while controlling the drive of the solenoid actuator 181 on the basis of an actuation signal from the parking switch.

The following is an explanation of the operations of braking and release of braking during normal running performed by the electric motor-driven brake apparatus 1 according to this embodiment.

When braking during normal running, the electric motor 31 is driven by a command from the control board 74, and rotation in the forward direction, i.e. the braking direction, is transmitted to the sun gear 135 of the planetary gear speed reduction mechanism 115 through the spur gear multistage speed reduction mechanism 114. The rotation of the sun gear 135 of the planetary gear speed reduction mechanism 115 causes each planetary gear 143 to revolve about the axis of rotation of the sun gear 135 while rotating about its own axis of rotation, thereby allowing the carrier 145 to rotate. In other words, the rotation from the electric motor 31 is transmitted to the carrier 145 after reducing the rotational speed and increasing the rotational force at a predetermined reduction ratio by passing through the spur gear multistage speed reduction mechanism 114 and the planetary gear speed reduction mechanism 115. Then, the rotation from the carrier 145 is transmitted to the push rod 190 of the ball screw mechanism 116.

Next, when the push rod 190 starts to rotate as the carrier 145 rotates, because the base nut 191 is supported non-rotatably relative to the piston 53, the balls 203 between the helical groove 199 of the push rod 190 and the helical groove 201 of the base nut 191 roll, and the push rod 190 advances while rotating relative to the base nut 191. At this time, as the push rod 190 rotates, the first clutch member 225 and the third clutch member 228 rotate in synchronism with each other.

Next, as the push rod 190 advances while relatively rotating, the annular step surface 198 of the push rod 190 pushes the first clutch member 225. Consequently, the first, second and third clutch members 225, 226 and 228 advance together while the first clutch member 225 and the third clutch member 228 relatively rotate, whereas the second clutch member 226 does not relatively rotate. Thus, the push member 280 advances through the thrust bearing 288.

More specifically, at this time, the rotational torque of the first clutch member 225 is transmitted to the return spring 227 through the second clutch member 226. The rotational torque is, however, still smaller than the predetermined set torque of the return spring 227. Therefore, the second clutch member 226 advances without rotating relatively. Although at this time the first clutch member 225 and the third clutch member 228 advance while relatively rotating, the ring-shaped plate 245, the ring-shaped plate 248, and the spring holder 229 do not relatively move in the rotational direction or the axial direction.

Next, as the push rod 190 continuously advances while rotating relative to the base nut 191, the first clutch member 225 and the third clutch member 228 continues to advance together while relatively rotating, and the convex spherical surface 284 of the push member 280 pushes the concave spherical surface 61 of the piston 53. Consequently, the piston 53 advances to press the inner brake pad 2 against the disk rotor D. Reaction force to the pressing force applied to the inner brake pad 2 by the piston 53 causes the caliper body 30 to move rightward in FIG. 3 relative to the bracket 5, thus pressing the outer brake pad 3 attached to the claw portions 35 against the disk rotor D. As a result, the disk rotor D is clamped between a pair of inner and outer brake pads 2 and 3 to generate frictional force and hence to generate braking force for the vehicle.

Next, when braking force starts to be generated as a result of the disk rotor D being clamped between the pair of inner and outer brake pads 2 and 3, the reaction force to the braking force is applied to the thrust sensor 117 via the push member 280, the third clutch member 228, the second clutch member 226, the first clutch member 225, the push rod 190, and the base nut 191. The thrust sensor 117 detects a thrust applied to the disk rotor D from the inner and outer brake pads 2 and 3 by the advancement of the piston 53. Further, at this time, as the piston 53 starts to advance, the ring-shaped plate 245, the ring-shaped plate 248, and the spring holder 229 start to advance together with the piston 53.

As the rotation of the push rod 190 is continued thereafter, the relative rotation of the push rod 190 causes the second clutch member 226 to relatively rotate through the first clutch member 225. Consequently, the first clutch member 225, the second clutch member 226, and the third clutch member 228 advance together while relatively rotating, and this causes the piston 53 to advance. Further, the rotation of the second clutch member 226 allows rotational force for rotating the push rod 190 in the retracting direction to be stored in the return spring 227. Thereafter, the drive of the electric motor 31 is controlled by detection signals from the rotation angle detecting part 119, the thrust sensor 117, etc. to establish a braking condition.

On the other hand, when releasing braking, the rotating shaft 32 of the electric motor 31 rotates in the reverse direction, i.e. in the brake releasing direction, in response to a command from the control board 74, and the rotation in the reverse direction is transmitted to the push rod 190 through the spur gear multistage speed reducer 114 and the planetary gear speed reduction mechanism 115. As a result, the push rod 190 retracts while relatively rotating in the reverse direction, which allows the return spring 227 to return to the initial state. Thus, the braking force applied to the disk rotor D by the pair of inner and outer brake pads 2 and 3 is released.

If the electric motor 31 or the control board 74 fails during braking, the second clutch member 226 is rotated in the reverse direction (retracting direction) and the first clutch member 225 is rotated in the reverse direction by the urging force stored in the return spring 227 during braking. Consequently, the push rod 190 retracts while relatively rotating in the reverse direction to release the braking force applied to the disk rotor D from the pair of inner and outer brake pads 2 and 3.

To activate the parking brake, for example, with the above-described electric motor-driven brake apparatus 1 according to this embodiment, when the parking brake switch is actuated, the control board 74 generates commands to generate braking force to be applied to the disk rotor D from the inner and outer brake pads 2 and 3 by the piston 53, as has been explained above, and to activate the solenoid actuator 181 to engage the lever member 171 with the gear portion 174 of the ratchet gear 170 (gear body portion 175) press-fittingly secured to the rotating shaft 32 of the electric motor 31. As a result, the rotating shaft 32 of the electric motor 31 is allowed to rotate in the forward direction for generating braking force but restrained from rotating in the reverse direction for releasing the braking force.

Consequently, the braking force applied to the disk rotor D from the inner and outer brake pads 2 and 3 by the piston 53 is held, and applying the parking brake is completed. On the other hand, to release the parking brake, when the parking brake switch is actuated, the solenoid actuator 181 is activated by a command from the control board 74, so that the lever member 171 is disengaged from the gear portion 174 of the ratchet gear 170 (gear body portion 175) press-fittingly secured to the rotating shaft 32 of the electric motor 31. Thereafter, the above-described operation is performed, and the braking force applied to the disk rotor D by the inner and outer brake pads 2 and 3 is released. Thus, the parking brake is released.

As has been explained above, the electric motor-driven brake apparatus 1 according to this embodiment includes a piston 53 pressing an inner brake pad 2 of a pair of inner and outer brake pads 2 and 3 against a disk rotor D, and a ball screw mechanism 116 applying a thrust to the piston 53 by rotation of an electric motor 31. The ball screw mechanism 116 has a base nut 191 and a push rod 190 threadedly engaged in the base nut 191. These are movable relative to each other in the axial direction. Consequently, it is possible to reduce the axial length of the cylinder portion 34 of the caliper body 30, and hence possible to attain a size reduction. Accordingly, it is possible to improve the mountability of the electric motor-driven brake apparatus 1 onto vehicles.

Further, in the electric motor-driven brake apparatus 1 according to this embodiment, the base nut 191 is supported non-rotatably relative to the caliper body 30, and the rotation from the electric motor 31 is transmitted to the push rod 190. Consequently, the push rod 190 moves in the axial direction while rotating relative to the base nut 191 to propel the piston 53. Therefore, there is no need to ensure a space for the base nut 191 to move linearly. Accordingly, it is possible to further reduce the axial length of the cylinder portion 34 of the caliper body 30 and hence possible to attain a size reduction.

Further, in the electric motor-driven brake apparatus 1 according to this embodiment, the carrier 145 of the planetary gear speed reduction mechanism 115 and the push rod 190 are connected non-rotatably relative to each other and axially movably relative to each other. Accordingly, the axial movable range of the push rod 190 can be extended to the inside of the planetary gear speed reduction mechanism 115, and it is possible to further reduce the axial length of the cylinder portion 34 of the caliper body 30 and hence possible to attain a size reduction.

Furthermore, in the electric motor-driven brake apparatus 1 according to this embodiment, the thrust sensor 117 abuts against one end surface of the base nut 191 to detect a reaction force to the thrust to the inner and outer brake pads 2 and 3 from the piston 53, which is transmitted to the base nut 191. Therefore, the space in the cylinder bore 50 can be used effectively.

Furthermore, in the electric motor-driven brake apparatus 1 according to this embodiment, the thrust sensor 117 is formed in the shape of a circular cylinder and disposed to abut against a surface of the base nut 191 on a side thereof closer to the planetary gear speed reduction mechanism 115 and radially outward of the push rod 190. Therefore, it is possible to further reduce the axial length of the cylinder portion 34 of the caliper body 30 and hence possible to attain a size reduction.

Furthermore, the electric motor-driven brake apparatus 1 according to this embodiment has a return mechanism 118 storing, when the push rod 190 propels the piston 53, rotational force for rotating the push rod 190 to be moved in the retracting direction. The return mechanism 118 is disposed radially outward of the push rod 190. Therefore, it is possible to further reduce the axial length of the cylinder portion 34 of the caliper body 30 and hence attain a size reduction.

Furthermore, in the electric motor-driven brake apparatus 1 according to this embodiment, the return mechanism 118 includes a return spring 227 applying urging force to the push rod 190 in the rotational direction, and first to third clutch members 225, 226 and 228 transmitting or cutting off rotational force between the return spring 227 and the push rod 190. Accordingly, it is possible to construct the return mechanism 118 with a simple structure and hence possible to suppress an increase in size.

Furthermore, in the electric motor-driven brake apparatus 1 according to this embodiment, the control board 74 is formed with a cut portion 104 to avoid interference with the push rod 190. Therefore, the axial movable range of the push rod 190 can be extended into the space where the control board 74 is disposed, and it is possible to further reduce the axial length of the cylinder portion 34 of the caliper body 30 and hence possible to attain a size reduction. It should be noted that although in this embodiment the cut portion 104 for preventing interference with the push rod 190 is formed in an end portion the control board 74, a hole or the like may be formed in place of the cut portion 104.

Examples of electric motor-driven brake apparatus 1 based on the foregoing embodiment include those according to the following aspects.

An electric motor-driven brake apparatus according to a first aspect has the following: transmission mechanisms 114 and 115 configured to transmit rotational force of an electric motor 31; a screw mechanism 116 configured to convert the rotational force of the transmission mechanisms 114 and 115 into a thrust; a pressing member 53 propelled by the screw mechanism 116; and a caliper 4 configured to movably support the pressing member 53. The screw mechanism 116 includes a nut member 191 non-rotatably supported relative to the caliper 4, and a shaft member 190 configured to receive rotational force from the transmission mechanisms 114 and 115. The shaft member 190 is movable relative to the nut member 191 in the axial direction of the shaft member 190.

According to a second aspect, in the first aspect, the shaft member 190 of the screw mechanism 116 propels the pressing member 63.

According to a third aspect, in the first or second aspect, the transmission mechanisms 114 and 115 are supported by the caliper 4, and the shaft member 190 is movable relative to the transmission mechanisms 114 and 115 in the axial direction.

According to a fourth aspect, in any of the first to third aspects, the caliper 4 includes a thrust detecting part 117 for detecting a reaction force to the thrust of the pressing member 53, the thrust detecting part 117 abutting against the nut member 191 to detect a magnitude of the reaction force transmitted from the nut member 191.

According to a fifth aspect, in the fourth aspect, the caliper 4 is formed with a bottomed cylinder bore 50 in which the screw mechanism 116 and the pressing member 53 are disposed, and the thrust detecting part 117 is disposed between the nut member 191 and the bottom wall 46 of the cylinder bore 50 and radially outward of the shaft member 190.

According to a sixth aspect, in any of the first to fifth aspects, a return mechanism 118 is provided between the shaft member 190 and the pressing member 53 to store, when the pressing member 53 is propelled, rotational force for rotating the shaft member 190 to be moved in the retracting direction, the return mechanism 118 being disposed radially outward of the shaft member 190.

According to a seventh aspect, in any of the first to sixth aspects, the shaft member 190 is movably arranged in a housing 70 accommodating a control board 74 controlling the drive of the electric motor 31, the control board 74 being formed with a cut portion 104 or a hole for avoiding interference with the shaft member 190.

It should be noted that the present invention is not limited to the foregoing embodiments but includes various modifications. For example, the foregoing embodiments have been described in detail to easily explain the present invention. Therefore, the present invention is not necessarily limited to the embodiments having all the configurations described above. Further, a part of the configuration of a certain embodiment can be replaced with a configuration of another embodiment, and a configuration of a certain embodiment can be added to a configuration of another embodiment. Further, a part of the configuration of each embodiment can be eliminated or replaced with another configuration. It is also possible to add another configuration to the configuration of each embodiment.

The present application claims priority to Japanese Patent Application No. 2017-199492 filed on Oct. 13, 2017. The entire disclosure of Japanese Patent Application No. 2017-199492 filed on Oct. 13, 2017 including specification, claims, drawings and summary is incorporated herein by reference in its entirety.

REFERENCE SIGNS LIST

1: electric motor-driven brake apparatus; 2: inner brake pad; 3: outer brake pad; 4: caliper; 30: caliper body; 31: electric motor; 34: cylinder portion; 50: cylinder bore; 53: piston (pressing member); 70: gear housing (housing); 74: control board; 104: cut portion; 114: spur gear multistage speed reduction mechanism (transmission mechanism); 115: planetary gear speed reduction mechanism (transmission mechanism); 116: ball screw mechanism (screw mechanism); 117: thrust sensor (thrust detecting part); 118: return mechanism; 190: push rod (shaft member); 191: base nut (nut member); 199: helical groove; 201: helical groove; 225: first clutch member; 226: second clutch member; 227: return spring; 228: second clutch member; D: disk rotor.

The invention claimed is:

1. An electric motor-driven brake apparatus comprising:
a transmission mechanism configured to transmit rotational force of an electric motor;
a screw mechanism configured to convert rotational force of the transmission mechanism into a thrust;
a pressing member propelled by the screw mechanism; and
a caliper configured to movably support the pressing member;
the screw mechanism including:
a nut member non-rotatably supported relative to the caliper;
a shaft member configured to receive rotational force from the transmission mechanism, the shaft member being movable relative to the nut member in an axial direction of the shaft member; and
a return mechanism provided between the shaft member and the pressing member to store, when the pressing member is propelled, rotational force for rotating the shaft member to be moved in a retracting direction,
wherein the return mechanism is disposed radially outward of the shaft member.

2. The electric motor-driven brake apparatus of claim 1, wherein, in the screw mechanism, the shaft member propels the pressing member.

3. The electric motor-driven brake apparatus of claim 1, wherein the transmission mechanism is supported by the caliper;
the shaft member is movable relative to the transmission mechanism in the axial direction.

4. The electric motor-driven brake apparatus of claim 1, wherein the caliper includes a thrust detecting part for detecting a reaction force to thrust of the pressing member;
the thrust detecting part abuts against the nut member to detect a magnitude of the reaction force transmitted from the nut member.

5. The electric motor-driven brake apparatus of claim 4, wherein the caliper is formed with a bottomed cylinder bore in which the screw mechanism and the pressing member are disposed;
the thrust detecting part is disposed between the nut member and a bottom portion of the cylinder bore and radially outward of the shaft member.

6. An electric motor-driven brake apparatus comprising:
a transmission mechanism configured to transmit rotational force of an electric motor;
a screw mechanism configured to convert rotational force of the transmission mechanism into a thrust;
a pressing member propelled by the screw mechanism; and
a caliper configured to movably support the pressing member,
the screw mechanism including:
a nut member non-rotatably supported relative to the caliper; and
a shaft member configured to receive rotational force from the transmission mechanism, the shaft member being movable relative to the nut member in an axial direction of the shaft member,
wherein the shaft member is movably arranged in a housing accommodating a control board controlling drive of the electric motor, and
the control board is formed with a cut portion or a hole for avoiding interference with the shaft member.

7. The electric motor-driven brake apparatus of claim 6, wherein, in the screw mechanism, the shaft member is configured to propel the pressing member.

8. The electric motor-driven brake apparatus of claim 6, wherein the transmission mechanism is supported by the caliper, and
the shaft member is movable relative to the transmission mechanism in the axial direction.

9. The electric motor-driven brake apparatus of claim 6, wherein the caliper includes a thrust detecting part for detecting a reaction force to thrust of the pressing member;
the thrust detecting part abuts against the nut member to detect a magnitude of the reaction force transmitted from the nut member.

10. The electric motor-driven brake apparatus of claim 9, wherein the caliper is formed with a bottomed cylinder bore in which the screw mechanism and the pressing member are disposed;
the thrust detecting part is disposed between the nut member and a bottom portion of the cylinder bore and radially outward of the shaft member.

11. An electric motor-driven brake apparatus comprising:
a transmission mechanism configured to transmit rotational force of an electric motor;
a screw mechanism configured to convert rotational force of the transmission mechanism into a thrust;
a pressing member propelled by the screw mechanism; and
a caliper configured to movably support the pressing member,
the screw mechanism including:
a nut member non-rotatably supported relative to the caliper; and
a shaft member configured to receive rotational force from the transmission mechanism, the shaft member being movable relative to the nut member in an axial direction of the shaft member,
wherein the caliper includes a caliper body, which is a main constituent of the caliper, and an electric motor disposed side by side with the caliper body,
a gear housing in which the transmission mechanism is provided is disposed at a bottom wall side of a cylinder portion of the caliper body,
the electric motor is secured with its body part inserted into an opening portion of the gear housing, and
the rotating shaft of the electric motor extends into the gear housing, whereby the rotational force of the electric motor is capable of being transmitted to the transmission mechanism,
the electric motor-driven brake apparatus further comprising:
a return mechanism provided between the shaft member and the pressing member to store, when the pressing member is propelled, rotational force for rotating the shaft member to be moved in a retracting direction,
wherein the return mechanism is disposed radially outward of the shaft member.

12. The electric motor-driven brake apparatus of claim 11, wherein, in the screw mechanism, the shaft member propels the pressing member.

13. The electric motor-driven brake apparatus of claim 11, wherein the transmission mechanism is supported by the caliper, and the shaft member is movable relative to the transmission mechanism in the axial direction.

14. The electric motor-driven brake apparatus of claim 11, wherein the caliper includes a thrust detecting part for detecting a reaction force to thrust of the pressing member, and
the thrust detecting part abuts against the nut member to detect a magnitude of the reaction force transmitted from the nut member.

15. The electric motor-driven brake apparatus of claim 14, wherein the caliper is formed with a bottomed cylinder bore in which the screw mechanism and the pressing member are disposed, and
the thrust detecting part is disposed between the nut member and a bottom portion of the cylinder bore and radially outward of the shaft member.

16. An electric motor-driven brake apparatus comprising:
a transmission mechanism configured to transmit rotational force of an electric motor;
a screw mechanism configured to convert rotational force of the transmission mechanism into a thrust;
a pressing member propelled by the screw mechanism; and
a caliper configured to movably support the pressing member,
the screw mechanism including:
a nut member non-rotatably supported relative to the caliper; and
a shaft member configured to receive rotational force from the transmission mechanism, the shaft member being movable relative to the nut member in an axial direction of the shaft member,
wherein the caliper includes a caliper body, which is a main constituent of the caliper, and an electric motor disposed side by side with the caliper body,
a gear housing in which the transmission mechanism is provided is disposed at a bottom wall side of a cylinder portion of the caliper body,
the electric motor is secured with its body part inserted into an opening portion of the gear housing, and
the rotating shaft of the electric motor extends into the gear housing, whereby the rotational force of the electric motor is capable of being transmitted to the transmission mechanism, wherein the shaft member is movably arranged in a housing accommodating a control board controlling drive of the electric motor, and the control board is formed with a cut portion or a hole for avoiding interference with the shaft member.

\* \* \* \* \*